March 22, 1960    R. C. DEVEREAUX ET AL    2,929,657
BODY REINFORCING LOCK COMBINATION
Filed Oct. 8, 1956
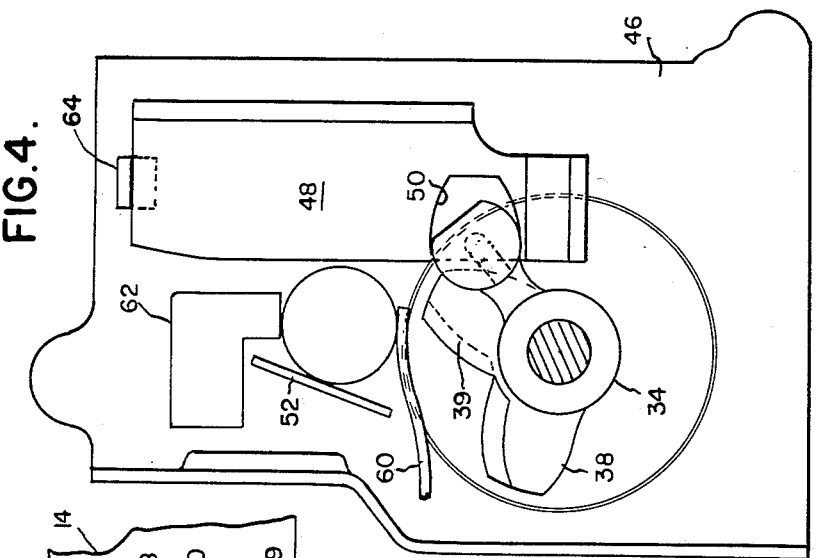
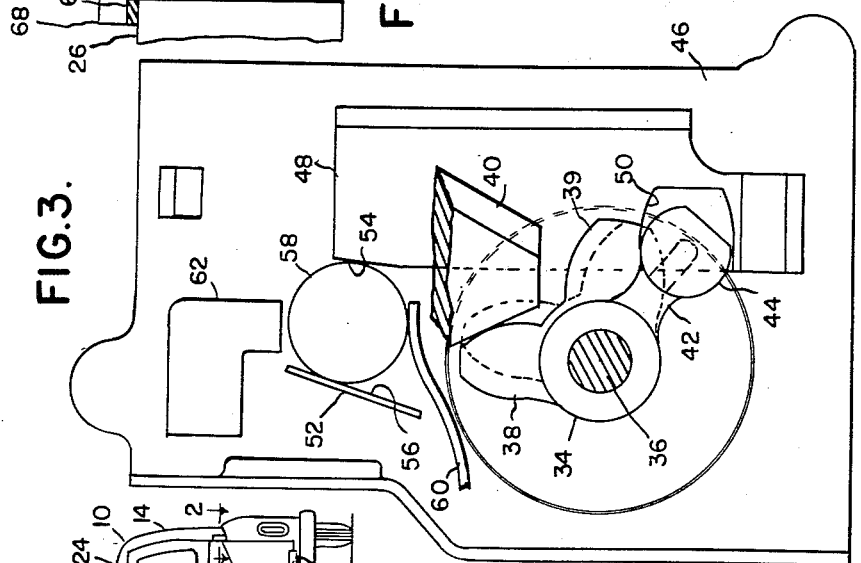
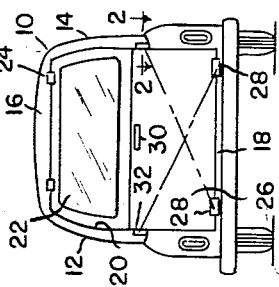
INVENTORS
RICHARD C. DEVEREAUX
BY JOSEPH PICKLES
Whittemore, Hulbert
& Belknap
ATTORNEYS United States Patent Office 2,929,657
Patented Mar. 22, 1960

2,929,657

BODY REINFORCING LOCK COMBINATION

Richard C. Devereaux, Birmingham, and Joseph Pickles, Dearborn, Mich., assignors to Ferro Stamping Company, Detroit, Mich., a corporation of Michigan Application October 8, 1956, Serial No. 614,612

3 Claims. (Cl. 296—106)

The present invention relates to a body reinforcing lock combination.

It is an object of the present invention to provide a body reinforcing lock combination, particularly in combination with the rear closure of a station wagon type vehicle.

More specifically, it is an object of the present invention to provide in a station wagon type vehicle having a rear closure hinged at its lower edge and having its free edge movable in closed position into spanning relation between substantially the mid-points of the rear edges of the side panels of the vehicle body, lock mechanism effective when in locking position to prevent opening movement of the rear closure and to prevent lateral outward separating movement between the mid-portions of the rear edges of the side panels of the vehicle.

Still more specifically, it is an object of the present invention to provide lock mechanism in the relationship described in the preceding paragraph including locking rotors having inclined teeth associated with correspondingly inclined teeth on fixed keeper members.

Other objects and features of the invention will become apparent as the description proceeds, especially when taken in conjunction with the accompanying drawings, illustrating a preferred embodiment of the invention, wherein:

Figure 1 is a rear elevation of a convertible type vehicle to which the present invention is applied.

Figure 2 is a diagrammatic view taken substantially on the line 2—2, Figure 1, showing the operation of the locking mechanism.

Figure 3 is a diagrammatic elevational view of the lock mechanism showing the parts in locked position.

Figure 4 is a view similar to Figure 3 showing the parts in unlocked position.

In Figure 1 the vehicle body indicated at 10 includes side panels 12 and 14, a top 16, and a floor structure 18. These body elements define a rear opening indicated generally at 20 adapted to be closed by a top closure member 22 hinged as indicated at 24, and a bottom closure member 26 hinged as indicated at 28. In practice, locking mechanism is provided in association with the bottom closure member 26 and includes an actuating handle 30 and lock mechanism, the location of which is indicated at 32. It will be observed that the lock mechanism is located substantially midway between the top and bottom of the rear edge portions of the side panels 12 and 14.

Station wagon type automotive vehicles are subject to the objection that the body is not strongly cross braced. The present invention provides means which in effect causes one of the rear closure members to become a transverse strut rigidly supporting the mid-portions of the rear edges of the side panels of the vehicle, in addition to performing its usual function of retaining the closure member locked or latched in closed position.

Referring now to Figures 2–4, the lock mechanism comprises locking rotors 34 carried by the rear closure member 26 adjacent the upper corners thereof. The locking rotors 34 are mounted for rotation on or with horizontal shafts 36, the axes of which extend transversely of the vehicle. Figures 3 and 4 are vertical elevational views looking at the edge of the closure member, for example that shown at the left in Figure 1 as viewed from the left.

The rotors 34 are provided with a plurality of teeth 38 and 39 which may conveniently be of involute profile. Carried by the side panels of the vehicle body are keepers each of which includes a stationary or fixed tooth 40 which may be in the form of a rack tooth and which is therefore conjugate to the involute teeth 38 and 39 of the rotor. Also extending from the rotor 34 and out of the plane of rotation of the teeth 38 and 39 is an actuating arm 42 terminating in a rounded end portion 44. Vertically movable on the mounting plate 46 carrying the locking structure mounted on the closure member is a slide 48 having a recess 50 formed therein which receives the rounded end 44 of the actuating arm.

Mounted on the plate 46 is an inclined element 52 and the upper edge of the slide 48 adjacent the member 52 is inclined as indicated at 54. The surface of the inclined portion 54 and the adjacent surface 56 of the element 52 are tapered and provide a wedging pocket in which the wedge disc 58 is receivd. Suitable spring means diagrammatically indicated at 60 are provided urging the wedging disc 58 upwardly into wedging or locking position.

The handle 30 is connected by suitable mechanism (not shown) to a disc releasing lever 62 which is movable downwardly from the position of Figure 3 to the position of Figure 4, thus releasing the slide 48 for upward movement to a position determined by the stop element 64. Upward movement of the slide 48 is accompanied by counterclockwise rotation of the rotor 34 to the position shown in Figure 4 in which position it will be noted the tooth 38 is in clearance with respect to the stationary tooth 40 of the keeper and hence, permits the closure member on which the plate 46 is mounted, to swing to open position.

It will be appreciated that with the parts in the position shown in Figure 4, closing movement of the closure member causes the tooth 39 to strike the stationary keeper tooth 40, which will rotate the rotor 34 clockwise to the position shown in Figure 3.

Referring now to Figure 2, there is diagrammatically illustrated the type of holding action resulting when the tooth 38 in engaged behind the stationary tooth 40 of the keeper. In this figure a portion of the rear closure member 26 is illustrated and is shown as engaging against a sealing or bumper strip 66 carried by a flange 68 provided at the rear edge of the side panel 14. In this figure the tooth 39 is illustrated as engaged at the opposite side of the tooth 40. This is a relationship not illustrated in Figures 3 and 4 where the tooth 39 is shown in clearance, but is a relationship which may be advantageously employed. In other words, in locked position the stationary tooth 40 may be in substantial mesh without backlash between adjacent teeth 38 and 39 of the rotor. In any case, it will be observed that the rear closure member 26, with the parts in the relationship illustrated in Figure 2, constitutes a rigid strut interconnecting central portions of the rear edges of the side panels 12 and 14. This is because movement of the right hand side panel 14 to the right in Figure 2 is prevented by the engagement between abutting surfaces of the teeth 38 and 40. The same condition prevails at the opposite edge of the closure member and hence the closure member itself constitutes a rigid strut or tension member interconnecting the edge portions of the side panels of the vehicle.

Of course, it is observed that the engagement between the teeth 38 and 40, while the rotor 34 is retained against rotation, also holds the rear closure member 26 in latched or locked position.

The lower rear closure member 26 may further reinforce the body of the vehicle by acting as a truss. Its hinges 28 provide rigid mechanical connections between the closure member and the body of the vehicle preventing relative movement except pivotal movement about the axes of the hinges. Accordingly, when the lock mechanism illustrated at 32 is associated with the hinge means 28, a four-point connection between body portions of the vehicle is provided which in effect constitutes truss structure suggested by the dot and dash lines of Figure 1. In this case of course it will be appreciated that the rear closure member 26 will be formed with sufficient rigidity to serve its function as a body truss.

The drawings and the foregoing specification constitute a description of the improved body reinforcing lock combination in such full, clear, concise and exact terms as to enable any person skilled in the art to practice the invention, the scope of which is indicated by the appended claims.

What we claim as our invention is:

1. An automotive vehicle of the station wagon type having a body comprising side panels, a top, and floor construction defining therebetween a substantially completely open rear end, a pair of rear closure members respectively hinged on substantially horizontal axes adjacent the top and bottom edges of the opening at the rear of said body, one of said closure members having rotary lock members adjacent the corners thereof remote from the hinged edges thereof, cooperating keepers at the rear edges of said side panels, said rotary members and keepers including abutment surfaces radially extending with respect to said rotary members, inclined to the axes of rotation of said rotary members and engageable to prevent swinging of said one closure member toward open position and to prevent lateral outward movement of the keepers carried by the side panels, whereby said one closure member in closed position constitutes a reinforcing strut between said side panels, slides movably attached to said one closure member adjacent to said rotary members, the upper portion of the surface of said slides closest said rotary members being inclined away from said rotary members, inclined members also mounted on said one closure member adjacent said slides forming wedge pockets with the inclined surface of said slides, releasable wedge means resiliently held within said wedge pockets, and wedge release levers extending through said one closure member adjacent said wedge means operable to release said wedge means from said wedge pockets thereby allowing said slides to move whereby said abutment surfaces may be disengaged.

2. An automotive vehicle of the station wagon type having a body comprising side panels, a top, and floor construction defining therebetween a substantially completely open rear end, a pair of rear closure members respectively hinged on substantially horizontal axes adjacent the top and bottom edges of the opening at the rear of said body, one of said closure members having rotary lock members adjacent the corners thereof remote from the hinged edges thereof, cooperating keepers at the rear edges of said side panels, said rotary members and keepers including abutment surfaces radially extending with respect to said rotary members, inclined to the axes of rotation of said rotary members and engageable to prevent swinging of said one closure member toward open position and to prevent lateral outward movement of the keepers carried by the side panels, whereby said one closure member in closed position constitutes a reinforcing strut between said side panels, wedge release levers attached to a handle on said one closure member and extending through said one closure member adjacent said rotary members, a slide attached to said one closure member adjacent one side of each of said rotary members and movable with respect thereto, each slide having a recess in the side thereof closest to said rotary members, the upper portion of the surface of each said slide which is closest to said rotary members being inclined away from said rotary members, an inclined element attached to said one closure member adjacent each said slide forming wedging pockets with the inclined surface of each slide, wedge discs inserted within said wedging pockets and held therein by spring means also attached to said one closure member whereby each slide is held in a fixed position, an actuating arm terminating in a rounded end mounted on each said rotary member, said rounded end being inserted within said recess in each slide whereby said rotary members are prevented from rotating while said discs are in said pockets holding each slide in said fixed position, said disc release levers acting in opposition to said spring means, means in response to a turn of said handle to dislodge said wedge discs from said wedging pockets allowing each slide to move under force from said actuating arm, said rotary members rotating with each actuating arm when said one closure member is moved toward said open position thereby disengaging said abutment surfaces.

3. In a station wagon having side panels, a rear closure hinged at its lower edge and having its upper edge in closed position adapted to span the rear edge of the side panels substantially centrally thereof, lock mechanism for said closure comprising fixed keepers at the rear edges of said side panels substantially centrally thereof, said keepers having teeth of rack form inclined approximately equally to the planes of the side panels and to the plane of the rear closure in closed position, locking rotors carried by the corner portions of said closure member remote from its hinged edge, said rotors being mounted for rotation about horizontal axes occupying the plane of said rear closure, said rotors having teeth inclined to conform to the inclination of said rack form teeth on said keepers, said rear closure and side panels having abutment surfaces engaged when said rear closure is in closed position, the direction of inclination of the teeth of said keepers and rotors being such as to prevent outward movement of the central portion of the rear ends of said side panels when the teeth of said keepers and rotors are engaged, and releasable latch means engaged with said rotor to prevent rotation thereof in the direction required to open said rear closure.

References Cited in the file of this patent

UNITED STATES PATENTS

| | | |
|---|---|---|
| 299,284 | Sproul | May 27, 1884 |
| 1,239,899 | Gardner | Sept. 11, 1917 |
| 1,635,163 | Allison | July 12, 1927 |
| 2,263,065 | Baldauf | Nov. 18, 1941 |
| 2,288,926 | Strader | July 7, 1942 |
| 2,422,912 | Kling | June 24, 1947 |
| 2,551,010 | Kammeraad | May 1, 1951 |
| 2,634,147 | Robertson | Apr. 7, 1953 |